United States Patent [19]
Fischer

[11] 3,804,596
[45] Apr. 16, 1974

[54] CATALYTIC AMMONIA BURNER
[75] Inventor: Harry C. Fischer, Royal Oak, Md.
[73] Assignee: Allied Chemical Corporation, New York, N.Y.
[22] Filed: May 31, 1972
[21] Appl. No.: 258,157

Related U.S. Application Data
[62] Division of Ser. No. 75,646, Sept. 25, 1970, Pat. No. 3,685,310.

[52] U.S. Cl............ 23/288 R, 23/277 C, 23/288 F, 23/288 J, 23/288 K, 423/237
[51] Int. Cl............................ B01j 9/04, F01n 3/14
[58] Field of Search............ 23/288 R, 288 F, 288 J, 23/288 K, 288 M, 277 C, 281; 431/5, 202, 268; 62/7; 423/237, 403

[56] References Cited
UNITED STATES PATENTS

| | | | |
|---|---|---|---|
| 2,185,607 | 1/1940 | Richardson | 423/403 |
| 3,661,507 | 5/1972 | Breitbach et al. | 423/237 X |
| 1,915,120 | 6/1933 | Burke | 23/288 J |
| 1,193,796 | 8/1916 | Landis | 23/288 J X |
| 3,006,153 | 10/1961 | Cook | 62/48 |
| 3,608,324 | 9/1971 | Singleton et al. | 23/288 F X |

Primary Examiner—Joseph Scovronek
Attorney, Agent, or Firm—Gerard P. Rooney

[57] ABSTRACT

A catalytic ammonia burner having an insulated housing defining a combustion chamber; a conduit disposed within the housing containing a catalyst for partially dissociating the ammonia vapor; an opening in one end of the conduit communicating with a source of ammonia vapor for passage of the ammonia vapor through the catalyst in the conduit to partially dissociate the ammonia vapor; an aperture at the terminal end of the conduit for discharge of the partially dissociated ammonia; an opening in the housing for the introduction of air for combustion of the partially dissociated ammonia; and a passageway in the housing for the discharge of combustion products near the inlet end of the conduit such that the combustion products passing adjacent the conduit to the discharge passageway maintains the catalyst at a temperature at which ammonia is dissociated in the presence of the burner. Means are provided for diverting vaporized ammonia in excess of that required to maintain the apparatus at optimum operating temperature from the conduit containing the catalyst to a conduit leading directly to the combustion chamber without contacting the catalyst. The burner is particularly useful in an open cycle in-transit refrigeration system.

4 Claims, 4 Drawing Figures

CATALYTIC AMMONIA BURNER

This is a division, of application Ser. No. 75,646, filed 9/25/70 now Pat. No. 3,685,310 issued Aug. 22, 1972.

BACKGROUND OF THE INVENTION

The in-transit refrigeration system most commonly used today is the conventional closed cycle system employing a compressor. Although this system is the most common, it has several drawbacks, including high initial cost and high operating cost resulting from required maintenance and the need for an external source of power to drive the compressor. To overcome these drawbacks, attempts have been made to develop better in-transit refrigeration systems. Many of these attempts have involved open cycle systems, i.e., systems wherein the refrigerant is consumed instead of being recycled. One such attempt, involving the use of ammonia in an open cycle system, is described in U.S. Pat. Nos. 2,504,689 and 2,533,583. In the system described in these patents, ammonia, after serving as the refrigerant, is absorbed by water. A major drawback of this system is that it requires bulky absorber tanks which must be periodically drained of aqueous ammonia and recharged with fresh water. Disposing of the drained ammonia, which could be a pollutant, also presents a problem.

It is an object of this invention to provide a compact, efficient and economical refrigeration system, especially for in-transit service.

SUMMARY OF THE INVENTION

The refrigeration system of this invention comprises an open cycle ammonia refrigeration unit in combination with means for combusting the spent (vaporized) ammonia refrigerant. The combustion products, which contain no substantial amounts of harmful substances, are discharged to the atmosphere. By disposing of the spent ammonia in this manner, the invention overcomes the disadvantages inherent in prior art open cycle ammonia refrigeration systems having bulky absorber tanks which required draining and recharging periodically. The problem of disposing of the aqueous ammonia drained from the absorber tanks is also eliminated by this invention.

The refrigeration unit of the system includes an evaporator wherein liquid ammonia is vaporized by absorbing heat from the surroundings of the evaporator, i.e., the compartment being refrigerated. Liquid ammonia is fed to the evaporator through a conduit from a storage tank which is normally under autogenous pressure. The vaporized ammonia is conveyed from the evaporator through a conduit to means for combusting the vaporized ammonia. The refrigeration unit also includes means for regulating the flow of ammonia through the system to control the temperature of the compartment being refrigerated.

The vaporized ammonia can be burned directly in air. However, ammonia is difficult to burn directly in air for several reasons. First, it requires a very high ignition temperature (1,562°F). Second, it has a slow flame propagation rate, which makes it necessary to maintain a low flow rate in order to prevent flameout. Hence, in order to initiate and maintain direct combustion of ammonia in air, an auxiliary flame is normally required. When an auxiliary flame is readily available, such as in a nearby furnace or under a boiler, the vaporized ammonia can conveniently be combusted by this means. Unfortunately, however, an auxiliary flame is not usually available, especially in transport vehicles.

The flammability of ammonia can be improved by adding to it a more flammable gas, such as methane, acetylene, propane, or other petroleum gas. An advantage of this means for combusting the vaporized ammonia is that it permits the use of conventional gas burners. However, a major disadvantage of this means is that it involves the expense of supplying the more flammable gas.

The most effective gas to add to ammonia to improve its flammability is hydrogen, which can be generated by the catalytic dissociation of ammonia. Ammonia is dissociated into nitrogen and hydrogen in the presence of known catalysts at temperatures of at least about 900°F. Complete dissociation is not required because ammonia containing as little as about 2 percent by weight of hydrogen has sufficient flammability to burn in air without assistance. By utilizing the heat of combustion to maintain the catalyst at operating temperature, the vaporized ammonia can be readily combusted in a unit which is self-sustaining when in operation.

Hence, a preferred means for combusting the vaporized ammonia is an ammonia dissociator-burner comprising, within an insulated housing, a conduit containing an ammonia dissociation catalyst and having at its terminus an aperture permitting discharge and combustion of the partially dissociated ammonia such that the heat of combustion maintains the catalyst at a temperature at which ammonia is dissociated in the presence of the catalyst.

Additional means for combusting the vaporized ammonia include internal combustion engines which operate on either partially dissociated or undissociated ammonia as fuel. A principal advantage of such means is that the engines provide a source of power for use with the refrigeration system, such as for circulating air in the refrigerated compartment, or for any other use.

DETAILED DESCRIPTION

Figure 1:
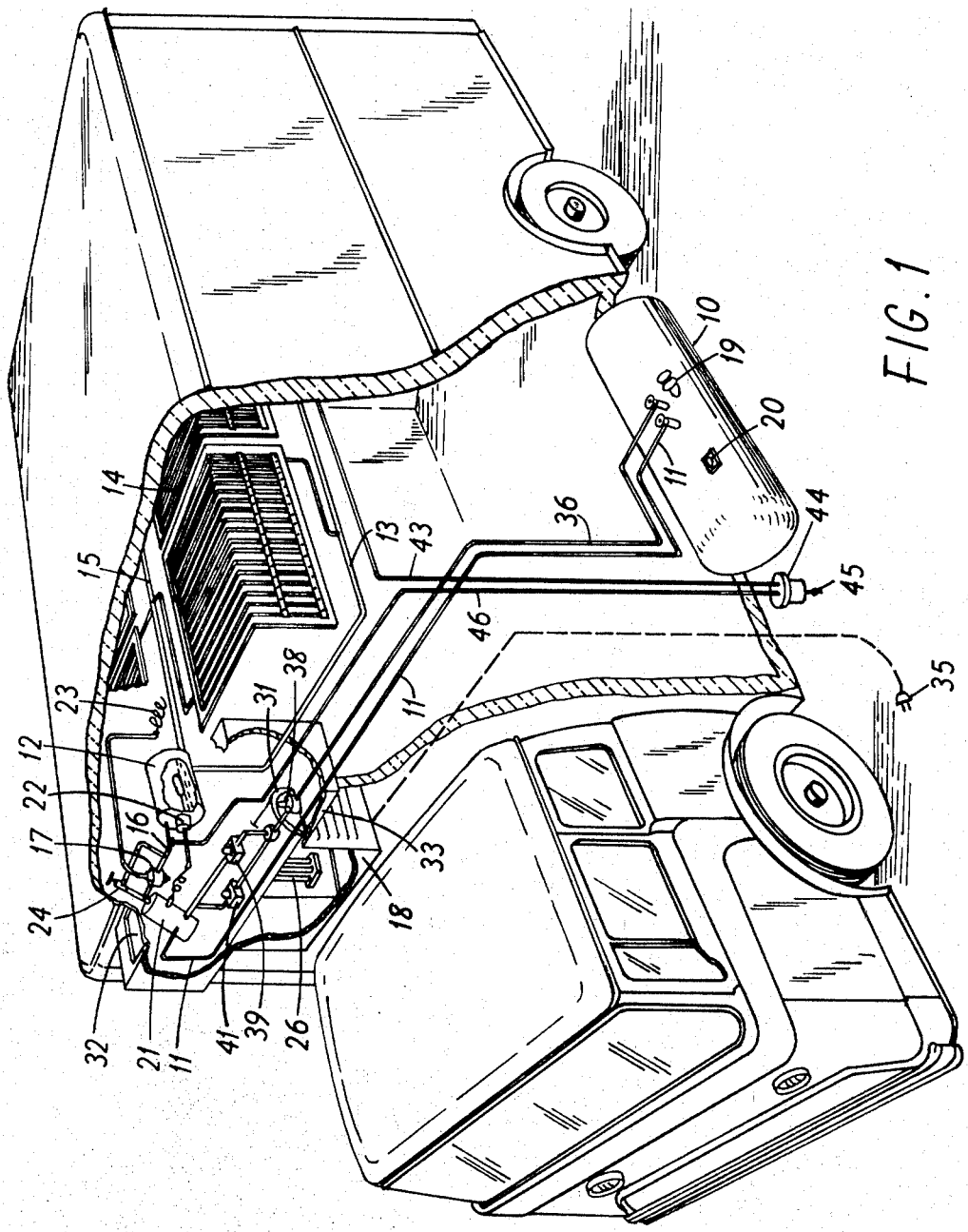
FIG. 1 is an isometric view, with a cutaway portion, of an embodiment of the refrigeration system of this invention as installed on a motor truck.

FIG. 1 illustrates a preferred embodiment of the refrigeration system as installed on a motor truck. A tank 10 for storing liquid anhydrous ammonia refrigerant is secured to the underside of a motor truck. The liquid ammonia flows from tank 10 through a conduit 11 to a surge tank 12. From surge tank 12 the liquid ammonia flows through conduit 13 to an evaporator 14 wherein the ammonia changes to a vapor as it absorbs heat from the interior of the cargo compartment of the truck. The vaporized ammonia leaves evaporator 14 through conduit 15 and returns to surge tank 12. Ammonia vapor flows from the surge tank through a network of conduits 16 and thermostatic throttling valve 17 to an ammonia dissociator-burner 18, wherein the ammonia vapor is partially dissociated and burned, the combustion products being discharged to the atmosphere.

Figure 2:
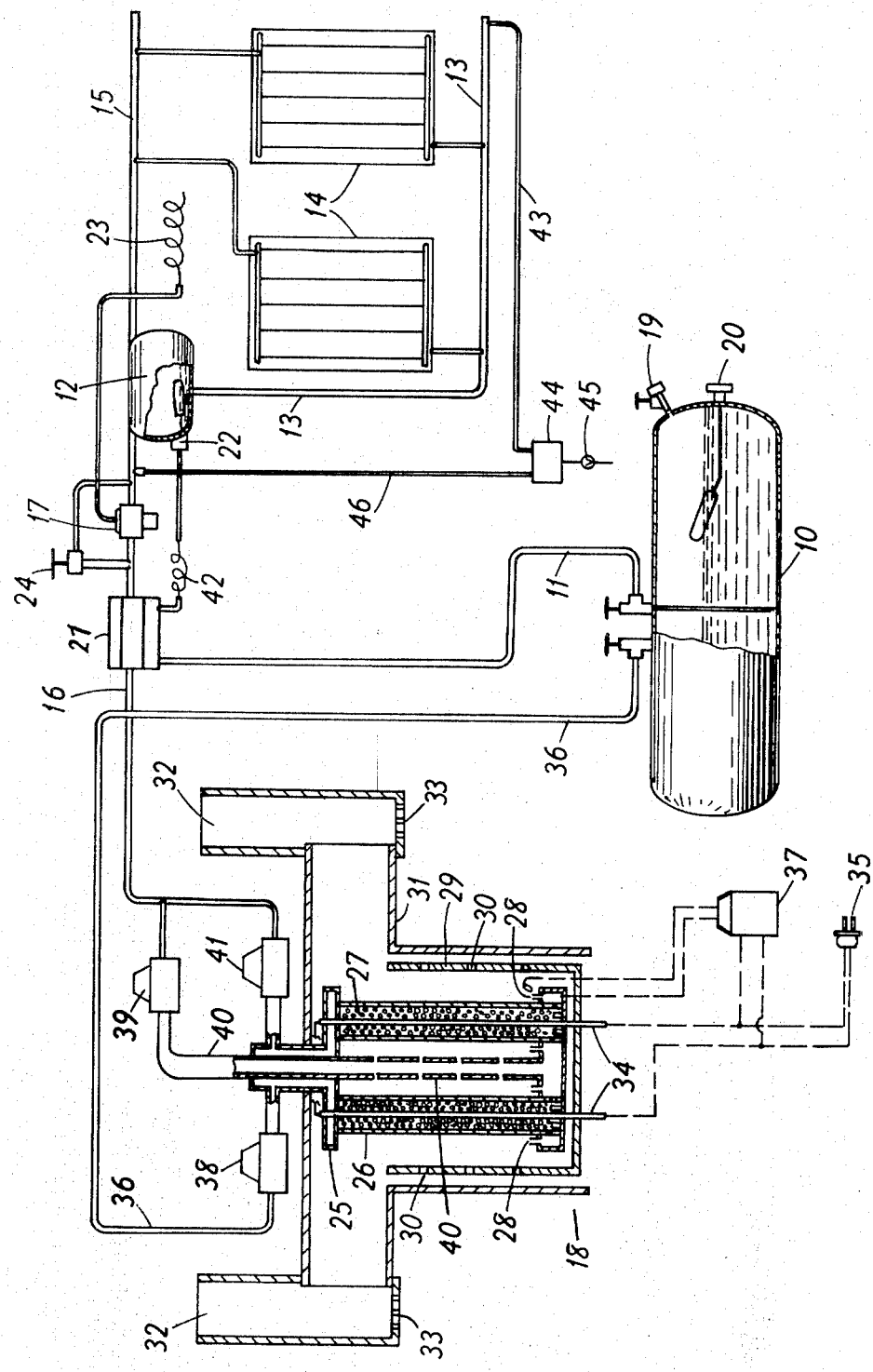
FIG. 2 is a schematic view depicting the embodiment of the invention shown in FIG. 1.

FIG. 2 shows the refrigeration system of FIG. 1 schematically in greater detail. The liquid ammonia storage tank 10 is equipped with a charging port 19. A liquid level indicator 20 indicates the amount of liquid ammonia in the tank. The tank 10 is constructed to withstand pressures autogenously developed within the tank at ambient temperatures. For example, on a 100°F. day the pressure in the tank 10 would be about 197 psig and on a 0°F. day the pressure would be about 15.7 psig. Sufficient pressure is developed within tank 10 to cause the liquid ammonia to flow to surge tank 12.

Before entering surge tank 12, the liquid ammonia passes through a heat exchanger 21, wherein it is cooled by the ammonia vapor leaving the surge tank 12.

The level of liquid ammonia in the surge tank 12 is controlled by a low side float valve 22. In lieu of float valve 22, a solenoid valve (not shown) actuated by a float switch (not shown) can be employed. A typical float switch which may be used includes an interior float which magnetically operates an exterior switch.

The liquid ammonia flows by gravity from surge tank 12 through conduit 13 to evaporator 14, which consists of roll-bond plates having internal passages (formed in the roll-bond process) through which the ammonia flows. Such plate type evaporators are readily available at low cost and are advantageous to use with refrigeration systems installed on smaller transport vehicles, such as local delivery trucks. The plates are mounted from the walls of the truck such that air convection around the plates can occur. Heat is absorbed from the circulating air by the ammonia as it changes from a liquid to a gas within the evaporator.

The vaporized ammonia returns to surge tank 12 through the network of conduits 15. The surge tank 12 permits separation of any liquid which might have been entrained with the returning vapor.

The pressure of ammonia in evaporator 14 is regulated by a thermostatic throttling valve 17, which reacts to the temperature in the truck in response to a sensing bulb 23. The thermostatic throttling valve 17 provides variable response to the refrigeration demands placed on the system. For example, a thermostatic throttling valve set at 32°F. will adjust the ammonia pressure to maintain a temperature of 32°F. within the truck. When the doors of the truck are opened, the inrush of warm air striking sensing bulb 23 will cause the thermostatic throttling valve 17 to open, thereby permitting a greater flow of ammonia, which results in a lowering of the temperature in the evaporator 14. When the doors are closed, thermostatic throttling valve 17 gradually closes as the temperature in the truck drops to 32°F. As the valve closes, the pressure of the ammonia vapor increases and raises the temperature in evaporator 14. Inasmuch as the boiling point of ammonia at atmospheric pressure is −28°F, the thermostatic throttling valve 17 can be bypassed when it is desired to maintain the lowest possible temperature, such as when the cargo in the compartment is frozen food. Bypass valve 24 permits the ammonia vapor to bypass the thermostatic throttling valve 17.

A principal advantage of the refrigeration system of this invention is that it permits variable response to refrigeration demands. Conventional closed cycle systems employing a compressor are not able to do so because such systems operate either at full capacity when the compressor is running or at no capacity when the compressor is not running. As a result, such systems do not provide satisfactory refrigeration for perishable products, which should be kept at the lowest possible temperature without being permitted to freeze. The refrigeration provided by such systems is unsatisfactory because the temperature of the cooling coils (evaporator) goes much below freezing and usually causes the product loaded closest to the coils to freeze. In contrast, the refrigeration system of this invention provides immediate variable response (instead of merely starting and stopping) to meet the refrigeration requirements exactly without going below a set temperature.

After passing through or bypassing the thermostatic throttling valve 17, the ammonia vapor continues to flow through the network of conduits 16 to an ammonia dissociator-burner 18. The ammonia vapor enters the dissociator-burner 18 at manifold 25 where the vapor is distributed to a plurality of conduits (catalyst tubes) 26 containing a catalyst 27 for partially dissociating the ammonia vapor. Catalysts for the dissociation of ammonia are well known in the art. For reasons of economy and convenience, iron, including activated iron promoted with $Al_2O_3$ or other metal oxides, such as $A_2O$, $ZrO_2$, $Cr_2O_3$, $MgO$, and $CaO$, is preferred. Ammonia dissociates in the presence of iron catalyst at temperatures above about 900°F. A temperature range of from about 1,200°F. to about 1,700°F. is preferred.

The partially dissociated ammonia is discharged from each of the conduits 26 through apertures 28, which are located at the terminal ends of the conduits. Upon being discharged from conduits 26, the partially dissociated ammonia is combusted in the presence of air such that the heat of combustion maintains the catalyst 27 at a temperature at which ammonia is dissociated in the presence of the catalyst. As shown in FIG. 2, this can be achieved by arranging the conduits 26 vertically with combustion occurring initially at the bottom of each of the conduits 26 so that the hot combustion gases rise in heat exchange relationship with the conduits 26. In order to conserve sufficient heat of combustion to maintain the catalyst 27 at operating temperature, conduits 26 are contained within an insulated housing 29 which defines a combustion chamber. The insulated housing 29 contains apertures 30 permitting air to mix with the discharged partially dissociated ammonia approximately in a stoichiometric ratio. The combustion gases are channeled through the insulated housing into an afterburner section 31 of the dissociator-burner 18. As the combustion gases are discharged to the atmosphere through openings 32 at the top of the afterburner section 31, they are diluted and cooled with air drawn in through grated openings 33. By constructing the housing 29 and the afterburner section 31 in the shape of a tee, as shown in FIGS. 1 and 2, the refrigeration system can be installed such that no part of it extends above the height of the truck.

Upon start-up, the temperature of the catalyst 27 must be raised to the point where dissociation of the ammonia vapor occurs. When iron is used as the catalyst, it is preferably raised to a temperature of at least about 1,000°F. The catalyst can be raised to this temperature by means of electrical heating elements 34 embedded in the catalyst 26. The elements 34 are heated by simply plugging electrical plug 35 into a suitable outlet while the truck is stationary. More simply, the temperature of the catalyst can be raised to the desired temperature by applying the flame of a portable torch to the conduit containing the catalyst.

After catalyst 27 has been brought up to temperature, ammonia vapor is permitted to flow through conduits 26 containing the catalyst 27. If desired, the ammonia vapor employed during start-up can be taken directly from the storage tank 10, in which case the vapor is permitted to flow through conduit 36 to dissociator-burner 18. Upon contacting catalyst 27, the ammonia vapor is partially dissociated into nitrogen and hydrogen. Sufficient dissociation to generate at least 2 percent hydrogen by weight is required in order to produce satisfactory combustion. As the partially dissociated ammonia is discharged through apertures 28, it is ignited by a continuous spark produced by an ignition device 37. Ignition is only required during start-up. Instead of producing a spark, the ignition device 37 could simply heat a wire to the ignition temperature of the partially dissociated ammonia. The flame of a torch can also be used to start the burner.

After start-up, the dissociator-burner 18 is self-sustaining. When the dissociator-burner 18 is in self-sustaining operation, the optimum temperature of the catalyst and the partially dissociated ammonia as it is discharged from conduits 26 is from about 1,200°F. to about 1,700°F. The optimum temperature within the dissociator-burner 18 at the walls of the combustion chamber is from about 1,500°F. to about 1,900°F.

It would be ideal to operate the dissociator-burner 18 at a steady flow rate of ammonia, but in actual practice the flow rate fluctuates greatly as it responds to the refrigeration demands placed on the system. Hence, the ammonia-dissociator 18 must be able to burn all ammonia delivered to it under conditions of both maximum and minimum flow; that is, the dissociator-burner 18 must be able to burn with substantially complete combustion all ammonia flowing at the maximum rate, yet combustion must not cease when ammonia is consumed at the minimum rate.

In the event the flow of ammonia through the refrigeration system falls below the minimum amount necessary to sustain the flame in the dissociator-burner 18, sufficient ammonia to sustain the flame can be supplied directly from storage tank 10 by placing a pressure regulating valve 38 in the conduit 36. By setting the valve 38 to open and maintain a minimum pressure in the conduit 16 connecting the surge tank 12 with the dissociator-burner 18, when the pressure falls below the level corresponding to the minimum flow rate necessary to sustain the flame, valve 38 will open to maintain the minimum pressure necessary to maintain the flame.

If, under conditions of maximum flow rate, all ammonia were allowed to flow through the conduits 26 containing catalyst 27, the result might be that catalyst 27 would be cooled by the incoming vapor to the point where the amount of hydrogen generated would be insufficient to sustain combustion. To avoid this situation, ammonia in excess of the amount required to maintain the dissociator-burner 18 at the optimum operating temperatures is introduced directly into the dissociator-burner without contacting catalyst 27. A bypass valve 39 diverts the flow of excess ammonia from the conduits 26 containing the catalyst 27 to a conduit 40 leading directly to the combustion chamber.

The bypass valve 39 opens at the pressure which corresponds to a flow rate at which ammonia is flowing in excess of that required to maintain the optimum operating temperature of catalyst 27. Since under optimum conditions the temperature within the combustion chamber is above the ignition temperature of undissociated ammonia, the excess ammonia burns without difficulty with the partially dissociated ammonia.

In order to maintain a steady uniform flow of ammonia to the catalyst tubes 26, a gas regulator valve 41 is interposed in conduit 16. The gas regulator valve 41 limits the flow of ammonia vapor to the amount required to maintain the dissociator-burner 18 at the optimum operating temperatures. For example, if this amount corresponds to a pressure of about 5 inches of water (typical for a truck refrigeration system), the bypass valve 39 would be set to open at about 10 inches of water and the gas regulator valve 41 would be set to limit the downstream pressure to about 5 inches of water.

During start-up, when the truck is warm, the rate of generation of ammonia vapor in the evaporator 14 might exceed the capacity of the dissociator-burner 18 to dispose of it without having flames appear outside. This situation can be avoided by having a section of conduit 11 be in the form of a capillary tube 42 which restricts the flow of liquid ammonia to the rate at which the dissociator-burner 18 can conveniently dispose of the vapor generated from the liquid. A ⅛ inch OD capillary tube (0.042 inch ID) having a length of about 3 feet is suggested for a typical truck refrigeration system, but the size of the tubing could, of course, be conveniently adjusted according to the capacity of the particular dissociator-burner employed.

As supplied commercially, anhydrous ammonia may contain a minor amount of water and oil. The amount of oil seldom exceeds 30 parts per million, but depending on source, water may vary from 0.2 percent to several percent. This water and oil collect as a residue as the ammonia evaporates in the evaporator 14. If permitted to accumulate, the water and oil would eventually impair the operation of the refrigeration system. To prevent this from happening, the water and oil are continuously bled through conduit 43 to trap 44 located near the ammonia storage tank 10 where they can be conveniently drained through valve 45 located at the bottom of the trap. Vent conduit 46 carries ammonia vapor from the trap to a connection in conduit 16 upstream from the throttling valve 17. The flow of water through the conduit 43 can be further limited to a suitable rate of flow (corresponding to about the rate at which water is collected) by employing capillary tubing as the conduit 43. The amount of ammonia which is lost through conduit 43 is negligible.

In certain situations it may be more economical to recover the vaporized ammonia than to consume it. Such situations exist when refrigeration is required for extended periods of time during which the transport vehicle bearing the refrigeration system is stationary near an ammonia recovery unit. For example, a local ice cream delivery truck which is on the road only during business hours usually requires refrigeration during nonbusiness hours as well. Continuous refrigeration is required not only to have the truck ready for operation at the beginning of each day, but also to avoid the problem of unloading and reloading the truck between delivery days. By conveying the vaporized ammonia to a recovery unit instead of to the dissociator-burner 18, when the truck is not on the road, the ammonia can be recovered for reuse. Another example involves intermodal containers which are transported by ship or railway (piggyback) as well as by trailer truck. When such containers are aboard ship, at dockside, or at a terminal, they may similarly be connected to an ammonia recovery unit. Several transport units can be connected to one central recovery unit.

By installing a manually operated on-off bypass valve in conduit 16, the ammonia vapor can be diverted from the dissociator-burner 18 to a recovery unit. The recovery unit liquefies the ammonia vapor and stores it for future use. Instead of being stored, however, the liquefied ammonia can be returned directly to the refrigeration system, in which case another manually operated on-off bypass valve is installed in conduit 11 to receive the liquefied ammonia.

Instead of connecting the refrigeration system to a recovery unit, the vaporized ammonia can be recovered by being condensed within the system, such as in the surge tank 12. For example, by condensing the ammonia vapor in surge tank 12 by means of cooling coils connected to another refrigeration system, the ammonia can be recycled instead of being consumed.

Figure 3:
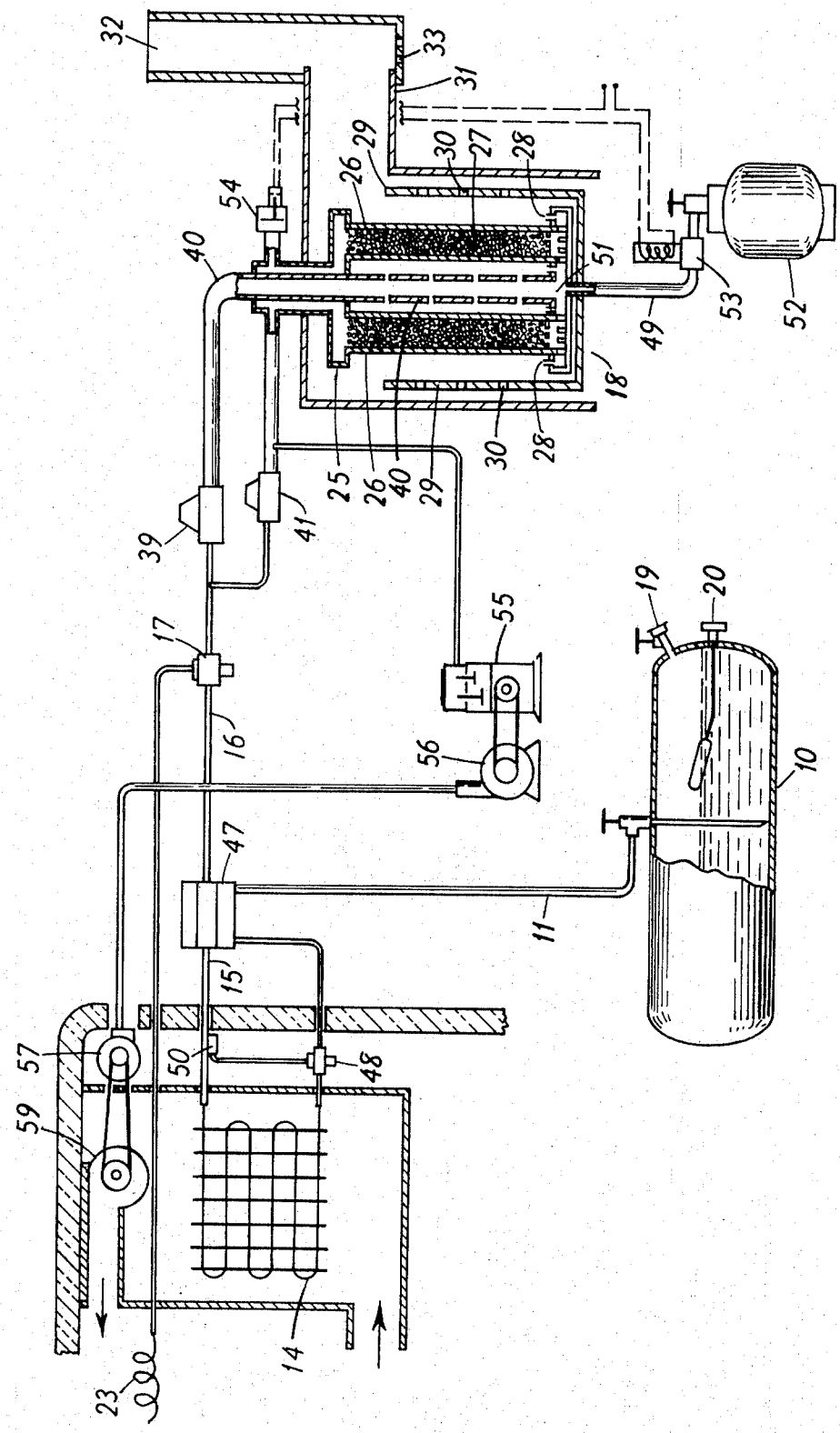
FIG. 3 is a schematic view of another embodiment of the refrigeration system of this invention.

FIG. 3 schematically illustrates another embodiment of the refrigeration system of this invention. Liquid ammonia flows from the storage tank 10 through a conduit 11 to a heat exchanger 47 wherein the liquid ammonia is cooled before passing through a thermostatic expansion valve 48 to an evaporator 14 wherein the ammonia changes to a vapor as it absorbs heat from the compartment being cooled. Upon leaving the evaporator 14, the vaporized ammonia flows through conduit 15 to the heat exchanger 47 wherein the vapor absorbs heat from the incoming liquid ammonia. From the heat exchanger 47 the ammonia vapor passes through a thermostatic throttling valve 17 before entering the dissociator-burner 18. In order to bring the dissociator-burner 18 up to operating temperature, and if necessary maintain it at operating temperature, liquefied petroleum (LP) gas is fed to the dissociator-burner 18 through conduit 49.

The liquid ammonia storage tank 10 is identical to the liquid ammonia storage tank 10 shown in FIGS. 1 and 2. Liquid ammonia flows under autogenous pressure from the storage tank 10 through conduit 11 to the heat exchanger 47. As the liquid ammonia passes through the heat exchanger 47, it is cooled by the vaporized ammonia coming from the evaporator 14 without coming in direct contact with the ammonia vapor.

The cooled liquid ammonia then passes through a thermostatic expansion valve 48 which regulates the flow of liquid ammonia to the evaporator 14 in response to the temperature of the vaporized ammonia at it leaves the evaporator 14. This temperature, which is measured by a sensing bulb 50, rises as the rate of flow of liquid ammonia to the evaporator 14 becomes inadequate; and in response to the higher temperature, the expansion valve 48 opens a greater amount to increase the rate of flow. Conversely, as the temperature of the leaving refrigerant falls, the expansion valve 48 gradually closes to decrease the rate of flow.

After passing through the thermostatic expansion valve 48, the ammonia enters the evaporator 14 where it is vaporized as it absorbs heat from the interior of the refrigerated compartment. As depicted in FIG. 3, the evaporator 14 comprises conventional finned coils, which are normally suspended from the ceiling of the compartment.

The vaporized ammonia leaves the evaporator 14 through conduit 15 and returns to the heat exchanger 47. In addition to permitting heat transfer between the vaporized ammonia and the incoming liquid, the heat exchanger 47 also acts as an accumulator and permits separation of any liquid which might have been entrained with the vaporized ammonia.

From the heat exchanger 47, the ammonia vapor flow through conduit 16, which contains a thermostatic throttling valve 17 which performs the same function as the thermostatic throttling valve 17 illustrated in FIGS. 1 and 2. In fact, by employing a single solenoid valve which is responsive to both the temperature within the refrigerated compartment and the temperature of the vaporized ammonia leaving the evaporator, a more simplified refrigeration system is provided in those cases where medium temperature (35°–45°F.) are to be maintained.

After passing through the thermostatic throttling valve 17, the ammonia vapor continues to flow through conduit 16 to the ammonia dissociator-burner 18, which is the same as the dissociator-burner 18 illustrated in FIGS. 1 and 2 except instead of having electrical heating elements as the means for initially heating the catalyst 27, the dissociator-burner 18 has a burner unit 51 which is connected to a source of liquefied petroleum gas 52. The burner unit 49 is situated such that the heat of combustion of the liquefied petroleum gas heats the catalyst 27 to a temperature at which ammonia dissociated in the presence of the catalyst.

In addition to providing the heat necessary to raise the temperature of the catalyst during start-up, the liquefied petroleum gas can also be used to maintain catalyst 27 and dissociator-burner 18 at the preferred operating temperatures in the event the flow of ammonia is insufficient to do so. This is achieved by interposing between the burner unit 51 and the source of LP gas 52 a solenoid valve 53 which is actuated by a switch 54 which reacts to the pressure in the conduit 16 conveying ammonia vapor to the dissociator-burner 18. When the pressure falls below the level corresponding to the minimum flow rate of ammonia required to maintain combustion, the switch 54 reacts to the lower pressure and causes the solenoid valve 53 to open, thereby permitting LP gas to flow to the burner unit 51 where the gas is burned. In lieu of being activated by the pressure in conduit 16, the solenoid valve 53 can be activated by other indicia of insufficient rate of flow of ammonia, such as the temperature within the dissociator-burner 18.

Some or all of the vaporized ammonia can also be utilized to run an internal combustion engine 55. Internal combustion engines utilizing undissociated ammonia as fuel have been developed and are described in publications available to the general public from the U.S. Department of Commerce (Clearinghouse for Scientific and Technical Information) under the designations AD 624,565, AD 633,632, AD 633,633, and AD 634,681. Internal combustion engines which ordinarily run on gasoline will run satisfactorily on ammonia which has been dissociated such that it contains from about 2.5 to about 10 percent by weight of hydrogen. The output of the internal combustion engine 55 can be used to perform useful work, such as operating a hydraulic pump 56 which drives a hydraulic motor 57 connected to air circulating fan 59 in the compartment being refrigerated. An electric generator (not shown) can be substituted for the hydraulic pump 56 and motor 57. A gas turbine (not shown) may be substituted for the internal combustion engine 55. Suitable ammonia-fired gas turbines are described in U.S. Department of Commerce publication AD 657,585.

A refrigeration system substantially as illustrated in FIG. 3, except that the internal combustion engine was connected to the dissociator-burner at the outlet of the catalyst tubes, was operated under conditions of low, moderate and high refrigeration loads based on typical requirements for refrigerated trucks. The catalyst employed was promoted iron supported on alumina and was obtained commercially from Girdler, Inc. under the designation G-47. The internal combustion engine was a 10 hp Briggs and Stratton gasoline engine with carburetion modified for fuel gas. The exhaust gases of the dissociator-burner and the internal combustion engine were analyzed for undissociated ammonia and oxides of nitrogen by scrubbing a measured volume of exhaust gas through an acidified aqueous solution of potassium permanganate to absorb ammonia and to oxidize nitric oxide and nitric dioxide to nitrate. The scrubber solution was then analyzed for ammonia and nitrate. The results are tabulated below.

ence of air such that the heat of combustion maintains the catalyst 27 at a temperature at which ammonia is dissociated in the presence of the catalyst. In order to conserve sufficient heat of combustion to maintain the catalyst 27 at such temperature, the conduit 26 is contained within an insulated housing 29.

As previously indicated, the optimum temperature of the partially dissociated ammonia as it is discharged from the conduit 26 is from about 1,200°F. to about 1,700°F. and the temperature within the dissociator-burner at the walls of the combustion chamber is preferably from about 1,500°F. to about 1,900°F. When the rate of flow of ammonia through the refrigeration system is in excess of that required to maintain these optimum operating temperatures, the excess ammonia is diverted to a conduit 40 which discharges the excess ammonia directly into the dissociator-burner where the undissociated ammonia is readily combusted. The flow of excess ammonia is diverted by a bypass valve 39, which may be a diaphragm actuated differential valve which opens on rise in pressure above a set point.

Although the refrigeration system of this invention has been described with particular reference to the refrigeration of trucks, the system can also be used to provide refrigeration in similar manner for other transport vehicles, such as railway cars and ships, and also for stationary locations. For example, the refrigeration system of this invention can be used to provide emergency or standby refrigeration in case of power failure or mechanical failure in the main system. Similarly, the Ammonia

| Run No. | Stream Analyzed | Refrigeration Conditions | Pressure to Dissociator, Inches of Water | Ammonia Consumption, Pounds Per Hour | Engine Operating Conditions | Sampling Period, Minutes | Oxides of Nitrogen, ppm | Undissociated Ammonia, ppm |
|---|---|---|---|---|---|---|---|---|
| 1 | Dissociator-Burner exhaust | Low | 8 | 3–6 | Off | 34 | 49 | 75 |
| 2 | do | Moderate | 15 | 10–14 | Off | 33 | 35 | 90 |
| 3 | do | High | 30–60 | 20–30 | Off | 34 | 97 | 153 |
| 4 | Engine Exhaust | Moderate | 15 | 10–14 | No Load | 30 | 194 | 125 |
| 5 | Engine Exhaust | Moderate | 15 | 19–14 | Loaded | 34 | 1150 | 1250 |
| 6 | Engine Exhaust | High | 30–45 | 20–30 | No Load | 33 | 357 | 438 |
| 7 | Engine Exhaust | High | 27–35 | 20–30 | Loaded | 30 | 1163 | 637 |

The above runs illustrate typical operating conditions for an average (30 foot) refrigerated truck and also demonstrate that the refrigeration system can be operated to produce only negligible amounts of harmful substances. For example, in comparison, automobile exhaust normally contains about 1,500 ppm of oxides of nitrogen, as well as pollutants derived from hydrocarbons.

Figure 4:
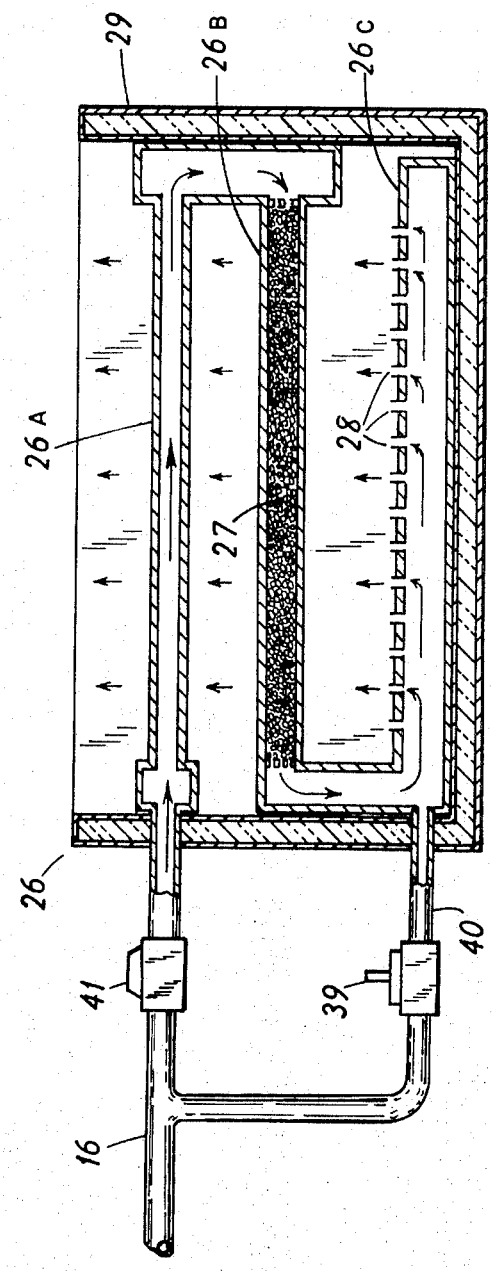
FIG. 4 is a schematic view of an ammonia dissociator-burner.

FIG. 4 illustrates another embodiment of the ammonia dissociator-burner. The dissociator-burner includes a conduit 26 having three successive sections. The entering ammonia vapor first passes through the preheater section 26A where the temperature of the ammonia is raised before entering the second section 26B, which contains the ammonia dissociation catalyst 27. After being partially dissociated in the section containing the catalyst, the ammonia enters the burner section 26C. The burner section 26C contains a plurality of apertures 28 through which the partially dissociated ammonia is discharged. Upon being discharged, the partially dissociated ammonia is combusted in the pressystem can be used to provide auxiliary refrigeration during periods of peak refrigeration requirements, such as occurs during especially hot summer days. In analogous manner, the refrigeration system can be used as the sole source of refrigeration where refrigeration is required for only a short period of time each year. For example, requiring no external source of power, the refrigeration system of this invention can be used in the field to provide quick refrigeration of fresh perishable products, such as berries, salmon or other fruit or fish, which are only available during short seasons.

I claim:

1. Apparatus for partially dissociating and burning ammonia vapor, comprising,
   a. an insulated housing defining a combustion chamber;
   b. a conduit disposed within the housing containing a catalyst for partially dissociating the ammonia vapor;
   c. an opening in one end of the conduit communicating with a source of ammonia vapor for passage of the ammonia vapor through the catalyst in the conduit to partially dissociate the ammonia vapor;

d. an aperture at the terminal end of the conduit for discharge of the partially dissociated ammonia into the combustion chamber;

e. an opening in the housing for the introduction of air for combustion of the partially dissociated ammonia in the combustion chamber;

f. means provided for diverting vaporized ammonia directly to the combustion chamber without passing through said catalyst conduit; and g. a passageway in the housing for the discharge of combustion products near the inlet end of the conduit such that the heat of combustion by means of the combustion products passing adjacent the conduit in the combustion chamber to the discharge passageway maintains the catalyst at a temperature at which ammonia is dissociated in the presence of the catalyst.

2. The apparatus of claim 1 having a plurality of conduits containing the catalyst, each being vertical and communicating at its upper end with a manifold, which distributes the incoming ammonia vapor to the conduits containing the catalyst.

3. The apparatus of claim 2 wherein the conduit leading directly to the combustion chamber includes a vertical, apertured section aligned parallel to the conduits containing the catalyst.

4. The apparatus of claim 1 wherein the discharge passageway has an opening for the introduction of secondary air prior to discharge of combustion products into the atmosphere.

* * * * *